June 7, 1932. M. BERMAN Re. 18,489

VENTILATING FAN

Original Filed Aug. 7, 1928

Inventor:
Morris Berman

Reissued June 7, 1932 Re. 18,489

UNITED STATES PATENT OFFICE

MORRIS BERMAN, OF BROOKLYN, NEW YORK

VENTILATING FAN

Original No. 1,838,609, dated December 29, 1931, Serial No. 297,922, filed August 7, 1928. Application for reissue filed February 2, 1932. Serial No. 591,633.

This invention relates to ventilating apparatus. It is particularly directed to a combined cooling and air circulating device for circulating cooled air in rooms and for the like purposes.

An object of this invention is to provide in apparatus of the character described, wherein the air is cooled prior to circulation, a device having a fan, refrigerating means including a compressor, and a single motive means for operating the entire device, mounted on a single shaft, the device furthermore being arranged for oscillating movement as a unit whereby a constant stream of cooled air may be effectively circulated over a large area.

A further object of this invention is to provide a neat, compact and unitary device of the character described which shall comprise comparatively few and simple parts, be of economical construction and yet positive and smooth in operation and practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of application will be indicated in the following claims.

In the accompanying drawing, in which is shown one of the various possible illustrative embodiments of this invention, Fig. 1 is a front elevational view of a device embodying the invention and wherein the evaporating coil is arranged on both sides of the fan;

Figure 1:
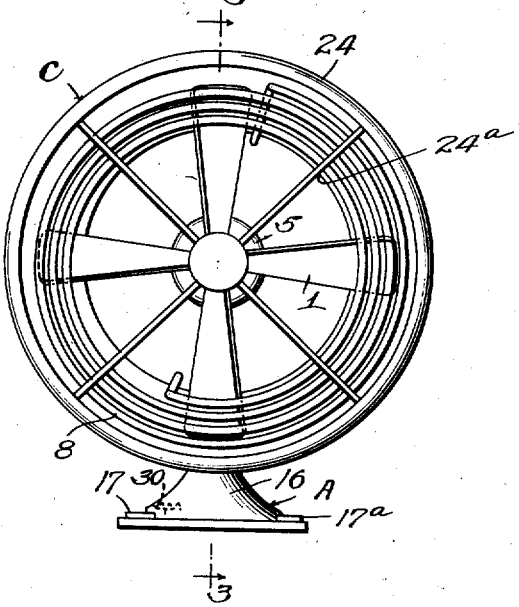
Figure 2:
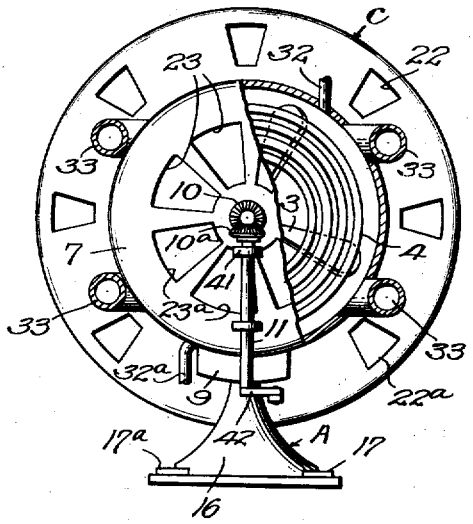
Fig. 2 is a rear elevational view of said device with parts broken away to show the interior construction.
Figure 3:
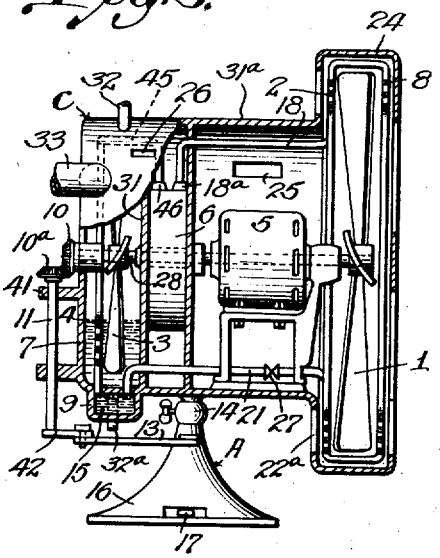
Fig. 3 is a cross-sectional view taken on line 3—3 of Fig. 1.

Referring now in detail to the drawing, A designates a cooling apparatus embodying the invention and comprises a base 16 on which is mounted as by means of a ball and socket connection 14, casing C. Said casing C comprises a cylindrical portion 40 and an enlarged annular section 24, to the front of which there is attached a fan guard 24*a*. The rear portion of casing 40 is covered by end wall 7. A pair of partition members 31, 31*a* made preferably of heat insulating material, divide the casing 40 into three compartments. Axially disposed with respect to the casings 40 and 24, is a rotatable shaft 28 extending thru suitable bearing openings in end wall 7 and partitions 31, 31*a*. Said shaft extends beyond the end wall 7 and attached to said extending portion is a vertically disposed bevel gear 10. Rotatably mounted in a pair of lugs 41 extending rearwardly from the casing wall 7 is a vertical shaft 11 provided with a bevel gear 10*a* at the upper end thereof, meshing with said bevel gear 10. Attached to the lower end of said shaft 11 is an eccentric 42 to which is preferably attached a link 13 pivoted to said eccentric as at 12, said link 13 being connected to the base 16 for producing an oscillating motion for the casing C in the well known manner in the electric fan art.

Mounted within the compartment formed between partition 31 and end wall 7 is a fan 3 adapted to direct a current of air rearwardly. Mounted on said shaft 28 in the compartment formed between partitions 31, 31*a* is a rotary compressor 6 of ordinary construction adapted to compress volatile liquids such as ordinarily used in machines employing rotary compressors. A motor 5 may be mounted within the compartment formed between the partition 31*a* and the large casing portion 24, said motor being of the ordinary construction and having the armature thereof attached to said axial shaft 28. Attached to the outer end of said shaft 28 and disposed within the casing portion 24 is a fan 1 adapted to circulate a current of air forwardly as the motor 5 operates.

The electric power controlling means for the motor 5 may be of ordinary construction such as in the usual electric fan. A switch handle 17 may be provided in the base 16, and a rheostat 30 likewise mounted in said base for permitting adjustment of the motor speed.

A similar switch handle 17*a* controls the operation of the refrigerating mechanism, by controlling the supply of power to a suitable clutch. The clutch (not shown) may be one of the magnetic type, suitably arranged to be drawn into position to engage the compressor shaft with the motor shaft when the switch handle 17*a* is thrown into power-supplying position, the clutch being arranged to disengage the compressor shaft from the motor shaft when the handle 17*a* is in cut off position. The design and operation of such clutches being well known, it is not thought to be necessary to show and describe it in detail.

A condenser coil 4 may be mounted within the compartment on one side or the other of the fan 3, said coil preferably being disposed adjacent the end wall 7 and between the fan 3 and said end wall, and being connected to the compression or outlet end 46 of the compressor 6 by means of pipe 45. A reservoir or tank 9 attached to the casing 40 is adapted to communicate with the condenser coil 4 and receive condensed liquid therefrom. Mounted within the casing portion 24 is an evaporating coil preferably having a section 2 mounted on the inner side of the fan 1 and a section 8 disposed on the outer side of said fan 1, said sections 2 and 8 being interconnected. A pipe 21 preferably interconnects the evaporation coil 2, 8 with the tank 9 containing the condensed fluid such as ammonia, sulphur dioxide or the like. Said evaporating coil is adapted to be connected to the suction end 18*a* of the rotary compressor as by a pipe 18. An expansion valve 27 interposed in the pipe 21 is adapted to permit expansion and evaporation of the condensed liquid coming from the condenser coil 4 and tank 9, the evaporation at reduced pressures taking place in said coils 2, 8 whereby heat is absorbed from the surrounding air for supplying the latent heat for the evaporation, as is well known in the art.

For permitting effective circulation of air through the device, rear wall 7 is provided with openings 23 in the upper portion thereof and similar openings 23*a* in the lower portion thereof, while the casing portion 24 is provided with openings 22 and 22*a*. The side wall of casing portion 40 adjacent the end wall 7 thereof is provided with openings 26 to permit air to leave the condenser compartment. Said casing portion may likewise be provided with openings 25 to permit air to circulate around and cool the motor 5. The condensing coil 4 obviously is cooled by air currents from the fan blades 3. However, additional cooling means may be provided in the form of an ordinary water cooler for reducing the temperature in said condensing coils, the water being supplied thru a tube 32 in the upper portion of casing 40 and drained thru tube 32*a* in the lower portion of said casing. Obviously, when the condenser is water cooled, the casing openings 23, 23*a* and 26 may be closed by any suitable shutters, and the fan 3 removed. A flexible outlet pipe 33 of suitable diameter attached to the upper portion of the casing 40 adjacent the end wall 7 thereof, may serve as a conduit for exhausting warm air from within the casing to the outer air or the outside of the room in which the cooler is placed.

Figure 4:
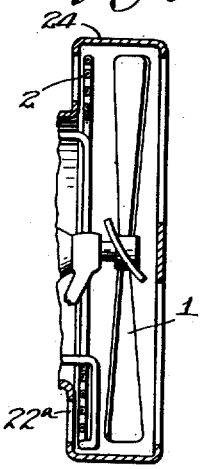
Fig. 4 is a partial cross-sectional view of the fan casing and illustrating a modified construction wherein the evaporating coil is arranged only behind the fan.
Figure 5:
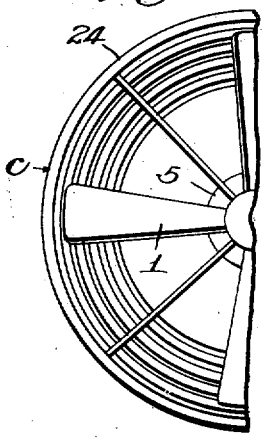
Fig. 5 is a partial front elevational view of the structure shown in Fig. 4.

It will now be readily understood that upon movement of the switch blade 17 for starting the operation of the motor 5, and upon movement of the switch blade 17*a*, the compressor 6 being connected to shaft 28 will simultaneously operate. Operation of the compressor will cause volatile fluid to be circulated under higher pressure to the condenser coil 4, said fluid being cooled in said coil by means of the fan blades 3 and water cooling means to a temperature below the boiling point of said fluid at the higher pressure. Some of the substance in the condenser will hence condense into liquid as shown at 15 in the drawing. The substance in the evaporator coils 2, 8, obviously being at reduced pressure (being connected to the suction side of the compressor) will have a low boiling point and hence the substance passing through the expansion valve 27 will evaporate. The evaporation of the liquid passing into the coils 2 and 8 will thus cool the air surrounding the fan blade 1, thus causing cooled air to be circulated through the room. As shown in Figs. 4 and 5 of the drawing, the evaporating or cooling coil or pipe 2 may be arranged in back only of the fan 1 so that said coil will not interfere with the flow of air in front of the fan.

In buildings where a refrigerating pipe line has been installed, the evaporating or cooling pipe may be suitably arranged with respect to an electric oscillating fan of usual construction for circulating cooled air in various directions. In loft or office buildings where more than one fan is to be operated, rotary means other than the motor 5 may be used to operate all of said fans. Obviously, the condenser may be detached from the central shaft and mounted at a higher level in the room and cooled by means other than the fan 3.

A dominant feature of this invention is the vision of a complete, compact, unitary refrigerating and air circulating unit mounted in a single casing on a single shaft and operated by a single motor means, the entire unit being adapted to oscillate for effectively circulating cool air over a comparatively large area.

It will thus be seen that there is provided a device in which the several objects of this invention are achieved, and which is well adapted to meet the conditions of practical use.

As various possible embodiments might be made of the above invention, and as various changes might be made in the embodiment set forth, it is to be understood that all matter herein set forth or shown in the accompanying drawing is to be interpreted as illustrative and not in a limiting sense.

Having thus described my invention, I claim as new and desire to secure by Letters Patent:

1. Apparatus of the character described comprising a motor, a fan operated by the motor, for directing an air current and means for cooling said air current including a compressor mounted coaxially with said motor, and an evaporating coil having a plurality of turns therein, part of the turns being arranged in front of the fan and part of the turns behind the fan.

2. A device of the character described comprising an electric motor having a central shaft, a fan mounted on said shaft, refrigerator means including a rotary compressor mounted on said shaft and actuated by the motor, and an evaporating coil arranged adjacent the fan and on both sides thereof.

3. In apparatus of the character described, in combination, an electric motor having an axial rotatable shaft, a fan mounted on said shaft, refrigerating means for cooling air circulated by said fan including a compressor operatively connected to the motor, and evaporating coil adjacent the fan, and a condenser coil remote from the fan, and means for oscillating said motor.

4. A device of the character described comprising a base, a casing mounted on said base for pivotal movement, a motor having an axial shaft mounted within said casing, refrigerating means within said casing, actuated by said motor, fan means mounted on said shaft, and means for oscillating said casing.

5. A device of the character described comprising a motor having a central shaft, a fan mounted on said shaft and refrigerating means including a compressor operatively connected to said shaft and actuable thereby, an evaporating coil adjacent the fan, a condensing coil, and conduits connecting the coils to the compressor, said motor and refrigerating means being oscillatory as a unit.

6. A device of the character described comprising a base, a casing mounted thereon, a plurality of partitions mounted transversely of said casing forming compartments, a motor mounted in one of said compartments, refrigerating means mounted in other of said compartments and means for oscillating the casing relatively to the base.

7. In apparatus of the character described, in combination, a base, a casing mounted thereon, a plurality of heat insulating partitions mounted transversely of said casing dividing same into a plurality of compartments, an axial shaft extending through said compartments, a motor in one of said compartments mounted on said shaft and adapted to rotate the same, a rotary compressor in another of said compartments and actuable by said shaft, and in another of said compartments, a fan mounted on the shaft and a coil adjacent thereto connected to the compressor.

8. In apparatus of the character described, in combination, a base, a casing mounted thereon, a plurality of heat insulating partitions mounted transversely of said casing dividing same into a plurality of compartments, an axial shaft extending through said compartments, a motor in one of said compartments mounted on said shaft and adapted to rotate the same, a rotary compressor in another of said compartments and actuable by said shaft, a fan in another of said compartments and a condenser associated with said compressor adjacent said fan.

9. In apparatus of the character described, the combination with a motor having an axial rotatable shaft extending from the opposite ends thereof, of fans mounted on said extending ends of said shaft, said fans being arranged for directing air currents in opposite directions, refrigerating means comprising a condenser adjacent one of said fans, and an evaporator adjacent the other of said fans, and means for oscillating said shaft about an axis other than the axis of the shaft.

10. The combination with a fan, of means for oscillating said fan about an axis other than the axis of rotation thereof, and a refrigerating unit arranged adjacent the fan and oscillatory therewith for cooling the air surrounding the fan, whereby the fan projects a stream of cooled air continuously in different directions.

11. The combination of a revoluble fan, means for oscillating said fan for directing the current of air projected by said fan in different directions, and a refrigerating unit associated with said fan and oscillatory therewith for cooling the air about the fan.

12. In apparatus of the character described, a casing, a condenser coil at one end of the casing, venting means for said casing including an outlet pipe for venting that part of the casing surrounding a coil and including openings at other parts of the casing, a fan at the other end of the casing, an evaporating coil surrounding the fan, a compressor in the casing interposed between said coils.

and means between said coils for rotating the fan and the compressor.

13. In apparatus of the character described, a casing, a condenser coil at one end of the casing, a fan at the other end of the casing, an evaporating coil surrounding the fan, a compressor in the casing interposed between said coils, means between said coils for rotating the fan and the compressor, and means for oscillating the casing whereby the air cooled by the evaporating coil is projected by the fan in different directions.

14. In apparatus of the character described, a casing, a fan at one end of said casing, an evaporating coil surrounding the fan, means in the casing for evaporating fluid in said coil and for circulating said fluid, and means for oscillating the casing.

15. In apparatus of the character described, a casing, a fan at one end of the casing, an evaporating coil adjacent said fan, a motor in the casing, refrigerator elements in the casing connected to the coil, one of said elements being actuated by the motor, and means for oscillating the casing and the parts carried thereby as a unit.

16. An apparatus of the character described, in combination, an electric motor having an axial rotatable shaft, a fan mounted on said shaft, refrigerating means for cooling air circulated by said fan including a compressor operatively connected to said motor, an evaporating pipe disposed adjacent to and behind said fan, and a condenser remote from said fan, and means for oscillating said motor.

17. An apparatus of the character described, in combination with a motor having an axial rotatable shaft extending from the opposite ends thereof, and fans mounted on said extended ends of said shaft, said fans being arranged for directing air current in opposite directions, refrigerating means comprising a condenser adjacent one of said fans, and an evaporator adjacent the other of said fans, said condenser and evaporator being located between said fans and said motor, and means for oscillating said shaft about an axis other than the axis of said shaft.

Signed at New York city, county of New York, State of New York, this 21st day of January, 1932.

MORRIS BERMAN.